United States Patent
Diemer et al.

(10) Patent No.: US 7,205,505 B2
(45) Date of Patent: Apr. 17, 2007

(54) SURFACE HEATING, METHOD FOR ITS PRODUCTION, AND HEATABLE OBJECT, AND SEAT OCCUPANCY RECOGNITION, SEAT WITH IT, AND SEAT OCCUPANCY RECOGNITION METHOD

(75) Inventors: Michael Diemer, Jönköping (SE); Stefan Diemer, Alsheim (DE)

(73) Assignee: Braincom AG, Munich (DE)

(*) Notice: Subject to any disclaimer, the term of this patent is extended or adjusted under 35 U.S.C. 154(b) by 186 days.

(21) Appl. No.: 10/751,671

(22) Filed: Jan. 5, 2004

(65) Prior Publication Data

US 2005/0103773 A1 May 19, 2005

Related U.S. Application Data

(63) Continuation of application No. PCT/DE02/02456, filed on Jul. 4, 2002.

(30) Foreign Application Priority Data

Jul. 4, 2001 (DE) .......................... 201 10 906 U

(51) Int. Cl.
  *H05B 1/00*  (2006.01)
  *H05B 3/00*  (2006.01)
  *H05B 11/00* (2006.01)

(52) U.S. Cl. ...................... 219/217; 219/528

(58) Field of Classification Search ............... 219/217, 219/528, 444.1; 340/667, 666, 573.1, 573.4, 340/573.7; 200/85 R, 85 A
See application file for complete search history.

(56) References Cited

U.S. PATENT DOCUMENTS

| 3,768,156 A |   | 10/1973 | Caird et al. |
| 5,945,914 A | * | 8/1999  | Holmes et al. ............. 340/667 |
| 6,093,910 A | * | 7/2000  | McClintock et al. ....... 219/217 |
| 6,643,925 B1 | * | 11/2003 | Ormachea et al. ............ 29/857 |

FOREIGN PATENT DOCUMENTS

| DE | 21 48 191     | 4/1973  |
| DE | 26 16 771 A1  | 11/1976 |
| DE | 33 16 182 A1  | 11/1984 |
| DE | 33 21 516 A1  | 12/1984 |
| DE | 35 24 631 A1  | 1/1986  |

* cited by examiner

*Primary Examiner*—Robin Evans
*Assistant Examiner*—Vinod Patel
(74) *Attorney, Agent, or Firm*—Martin Fleit; Paul D. Bianco; Fleit Kain Gibbons Gutman Bongini & Bianco, P.L.

(57) ABSTRACT

A system for recognizing the occupancy of a seat, containing elements made of electrically conducting synthetic material, especially strips made of electrically conductive polyurethane. A seat equipped with the system. A method for recognizing seat occupancy whereby an alteration in resistance of the electrically conductive material occurring in a change of weight is detected.

34 Claims, 7 Drawing Sheets

SURFACE HEATING, METHOD FOR ITS PRODUCTION, AND HEATABLE OBJECT, AND SEAT OCCUPANCY RECOGNITION, SEAT WITH IT, AND SEAT OCCUPANCY RECOGNITION METHOD

RELATED APPLICATION

This application is a continuation of International Application No. PCT/DE02/02456, filed Jul. 4, 2002, the contents of which are here incorporated herein in their entirety.

BACKGROUND OF THE INVENTION

1. Field of the Invention

The invention relates to surface heating, method for its production, and heatable object, and seat occupancy recognition, seat with it, and seat occupancy recognition method, and a heatable object with such a surface heating and a method for the production of a surface heating. More particularly, the invention under consideration relates to a seat heating, a heated seat, and a method for its production. Preferably, the invention also relates to a heating for side linings and floor coverings, particularly in vehicles, side linings and floor coverings equipped with it, particularly in vehicles, and a method for its production. Furthermore, the invention under consideration relates to a mattress heating, a heated mattress, and a method for its production.

2. Prior Art

From actual practice, seat heatings are known, for example, for motor vehicles, which represent, in the sense of the invention, a surface heating and are formed by metal wires with a current through flow, as heating wires, and which are located between upholstery layers. This requires not only an expensive structure of a correspondingly equipped seat, but rather has disadvantages, in particular in operation. Thus, as a result of the stronger heating of surrounding layers in the immediate vicinity of the heating wires, there is a danger of overheating, which can lead to damage to the upholstery layers and/or the heating wires and can even cause a fire. Furthermore, the heat distribution over the surface is not optimal, since in the area of the heating wires, the temperature is always higher than at a distance from it. Another disadvantage with this known mode of construction is the mechanical stress which the heating wires are exposed to, if a passenger uses the seat, since in this way, the conductor wires can break, which can lead to a function failure and/or results in another possible fire source.

From DT 26 16 771 A1, an assembled heating body is known, which provides directed heat radiation and is formed from a plastic laminated plate with the incorporation of a semi conducting layer. This laminated plate consists of a rigid plastic laminated structure, which is formed from at least one layer of a reinforced substrate base material and a resin coat on this material, a semi conducting, carbon-containing prepolymer, which is bound to a heat-resistant, inorganic oxide carrier with a large surface, which is incorporated, as a layer, on at least one side of the layer of the substrate material, a heat-reflecting layer, incorporated in a position on one side of the prepolymer on the substrate material, and current supply devices to parts of the layer made of conductive, carbon-containing prepolymer at a distance from one another, and which produces electrical resistance heating in the laminated plate, which is reflected and radiated off by the heat-reflecting layer of the assembled body. Such heating plates are intended to be used as a part of a wall of a living space or an office.

In this state of the art, the incorporation of the semi conducting layer into the laminated plate can take place in that finely commuted, carbon-containing prepolymer, in the form of small particles or as a powder, is mixed with a suitable carrier or vehicle in such a way that it can be put on, spread, or applied in some other way on the surface of a resin-coated glass cloth, paper, felt, cardboard, and the like, as a laminated substrate or on a wood veneer, which is used in the laminated plate. Instead of that, the finely commuted, carbon-containing prepolymer can also be mixed with the resin or polymer material, with which a special, reinforcing base material is to be impregnated or which is to be applied on this base material as a coating, wherein this base material delivers at least a substrate material layer of the laminated plate. The resulting mixture is applied in or on the substrate by immersion or coating, and the resulting coated substrate is subjected to a semi-curing of the type such that the semi conducting prepolymer conveys a uniform impregnation and coating over the resulting, semi-cured laminated sheet.

DE 33 16 182 A1 deals with the use of molded articles, such as films, plates, or spatially formed structures, from the class of pyrrole polymers, which are complexed with anions, as electrical heating elements, in particular, for the heating of corrosive liquids or gases. The molded articles can thereby also be coated with organic plastics.

A polymeric composite heating element is described in DE 35 24 631 A1 and has the form of a film, tube, or rod. Such polymeric composite heating elements can be used, as such, as heating sources or can be laminated with traditional plastic films, in order to improve the material strength.

The use of electrically conductive, thermoplastic polyurethanes and their production are known from DE 33 21 516 A1. Corresponding products are suitable for, among other things, the production of films having a thickness of 1 to 2 mm for surface heating elements.

Thus, basically heating devices with electrically conductive plastic are known, but the entire state of the art does not have any indications or suggestions as to how such heating devices must be produced and equipped, in order to be able to use them in actual practice.

In a number of other publications of international patent classes H05 B 3/36 and 3/84, surface heatings, which have a layer made of electrically conducting plastics, are explained with examples of outside mirrors for motor vehicles. Essentially, films made of electrically conducting plastics on rigid carriers are thereby used. Use of a film made of electrically conducting plastics on the carrier structure of a motor vehicle seat, however, is not possible, since then all of the upholstery layers etc., lying over it, would be heated, until the heat came to a sitting passenger, which would consume a very large amount of energy.

SUMMARY OF THE INVENTION

Especially for seating or lying substrates, useful surface heatings with electrically conducting plastics have not become known. However, simple, low-cost, and safely operated heatings would be desired for, for example, motor vehicle seats or mattresses.

Therefore, the goal of the invention under consideration is to create, with the least possible expense, a surface heating with an electrically conductive plastic and an object with it.

This goal is attained with a surface heating, a heatable object, and a method for the production of a surface heating as described and claimed herein.

As additional advantages, the invention makes possible a good, simple, and safely operated design and a good heat distribution.

In accordance with the invention, a surface heating with a carrier and a heating layer is created, which contains electrically conductive plastic, wherein the heating layer is formed by a flexible film and the carrier is flexible.

Such a surface heating is further developed, within the framework of the invention under consideration, in that the carrier is a layer, in particular, a fabric or a nonwoven, preferably, a natural or synthetic fibrous nonwoven. Alternately, the carrier can be a molded article made of an elastic material, such as a seat upholstery of the flat part of a seat or a backrest, or a mattress.

Preferably, the heating layer contains polyurethane, single component polyurethane, crosslinked single component polyurethane, a PU foam, UV-stable and/or hydrolyzable or steam-permeable plastic material. However, other electrically conducting or conductive, foaming and foam materials can also be used, wherein plastic materials are preferred. Alternately or additionally, it is preferred that the electrically conductive plastic or heating layer contain graphite, preferably, in powder form.

With the surface heating, provisions can also be made such that contact ends of current supply wires in the heating layer or between the carrier and the heating layer are in contact with the latter. The contact ends of the current supply wires are preferably affixed by means of the heating layer itself to the latter or sewn or cemented in the heating layer and/or the carrier.

Furthermore, provisions are preferably made so that the heating layer is formed by spraying, rolling, or brushing directly on the carrier. Alternately, the heating layer can be cemented, sewn, or welded or affixed to the carrier in some other way.

Preferably also, a manually and/or electrically/electronically operatable and/or automatic current control is provided, which can be connected with a current source and to which the current supply wires are connected, whose contact ends are in contact with the heating layer.

A heatable object, which contains a surface heating in accordance with the preceding conformations, is also created by the invention.

Within the framework of the preferred development, the object is the surface part of a seat or a backrest or the upholstery of furniture for sitting or lying, in particular, a mattress, and the heating layer is anatomically adapted to the thigh-buttocks parts or back parts of a user. The latter is advantageously attained in that the heating layer is anatomically shaped in the plane of the surface part of the seat or the backrest or the upholstery of furniture for sitting or lying, in particular a mattress in that it is present or electrically conductive only in accordance with anatomical specifications. Alternately or additionally, the heating layer for the anatomically adapted heat release can have an appropriate thickness profile.

Another advantageous development of the heatable object consists in an upholstered lining, in particular, of a vehicle. Also, such a heatable object can be designed for a varying heat release over its surface.

Generally, provisions can also be made so that the heating layer for the varying heat release over its surface is profiled in its surface propagation and/or in its thickness.

Finally, the invention under consideration also creates a method for the production of a surface heating, wherein a heating layer with electrically conductive plastic is joined with a carrier. In accordance with the invention, the heating layer is formed by first applying an electrically conductive, in particular, foaming or foam-plastic material onto the carrier and then curing the plastic material on the carrier. A preferable further refinement of this method consists in first placing contact ends of current supply wires on the side of the carrier on which the plastic material is then applied, before applying the electrically conductive, in particular, foaming or foam-plastic material onto the carrier.

Alternately, provisions are made with a method of the invention for the production of a surface heating, wherein a heating layer with an electrically conductive plastic is joined with a carrier, so that the heating layer is produced from an electrically conductive, in particular, foaming or foam-plastic material and is then affixed on the carrier. Advantageously, after the affixing on the carrier, the heating layer can be joined with the latter in a slipping-secure manner. This is preferably done in that the heating layer is sewed, cemented, or welded with the carrier.

Preferably, but without limitation, electrically conductive polyurethane is used as the plastic material.

The method can be further refined in that contact ends of current supply wires are affixed on the heating layer and/or the carrier, so that in the composite of carrier and heating layer, they are in contact with the latter. To this end, the contact ends of the current supply wires are preferably sewn or cemented with the heating layer and/or the carrier.

Another refinement of the method of the invention consists in profiling the heating layer, during or after its production, in its surface form and/or thickness. If the heating layer is separately produced—that is, not directly on the carrier—then, its form can be obtained, for example, in a shaping framework or by punching out. Also the thickness can be varied over the surface of the heating layer.

Preferred and advantageous further refinements can be deduced from the dependent claims and their combinations and the entire disclosure content of these documents, including technical knowledge and the state of the art, in particular, to the extent it is given in the introduction of this description.

For example, the electrically conducting plastic material of the heating layer can contain carbon or carbon particles, in order to make available an electrical conductivity. Moreover, the material of the heating layer is such that during or after a temperature increase, it is at least essentially cured as a consequence of the heating effect and also remains moreover, dimensionally stable and undamaged. Polyurethane (PU) is, as already mentioned, preferably used for the electrically conductive plastic, but basically, all other materials disclosed in the state of the art indicated in the beginning can also be used, if they can be foamed. Other material data and technical background are disclosed, for example, in the publications, DE G 85 23 328.5, DE 298 08 842 U1, DE 197 11 522 A1, and DE 691 01 703 T2, whose contents have hereby been completely received, by reference, in the documents under consideration, so as to avoid mere repetition.

BRIEF DESCRIPTION OF THE DRAWINGS

The invention is explained below in more detail, with reference to embodiment examples, which are depicted in the drawings, in which the figures show the following.

DETAILED DESCRIPTION OF PREFERRED EMBODIMENTS OF THE INVENTION

In the description of the invention below, with the aid of embodiment examples, the same reference symbols are used throughout for the same or similarly acting parts. Even if not all details of the graphic depictions are treated in the following description, individual features and their relationships can be readily deduced by a specialist—if they are depicted in the figures—from the figures themselves.

Figure 1A:
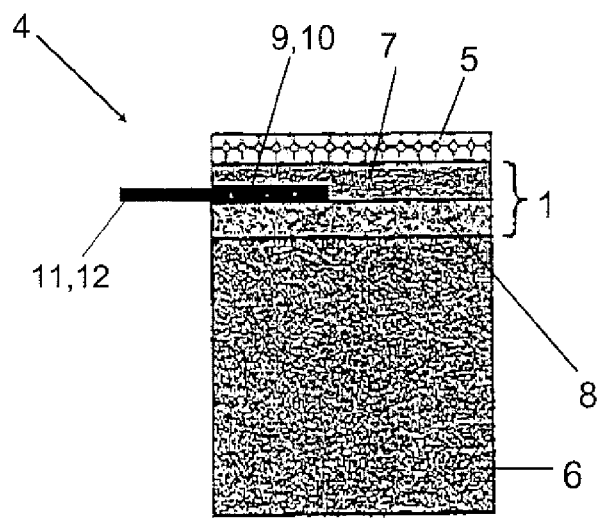
FIGS. 1a and b, schematically in a cut or perspective, partial view, a first embodiment example of the invention, in combination with a motor vehicle seat with a seat heating.
Figure 1B:
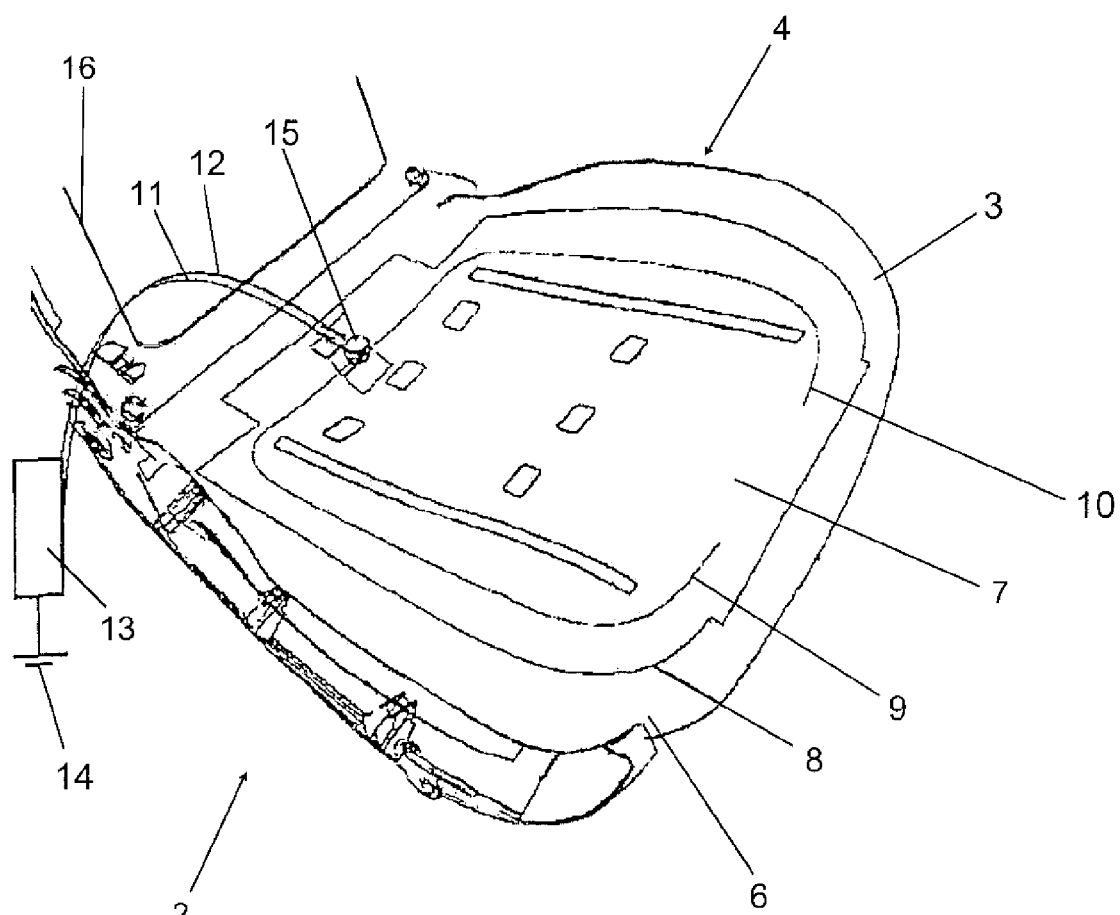

A motor vehicle seat 2, in whose seat surface part 3, a seat heating 4 is integrated, is shown, as a first embodiment example of a surface heating 1, in FIGS. 1a and 1b, in a cut or perspective schematic drawing.

The structure of the seat surface part 3 in the surroundings of the surface heating 1 is shown in FIG. 1a, in which a cross-sectional cut is depicted through the corresponding layers/components of the seat surface part 3. The surface of the seat surface part 3 is formed by a seat cover 5, which can be made of fabric, synthetic leather, or leather or other suitable materials, or combinations thereof. The form of the seat surface part 3 is at least essentially formed by an elastic foam-molded article 6. The components of the seat heating 4 are placed between the elastic foam-molded article 6 and the seat cover 5.

The seat heating 4 is formed by the surface heating 1, which contains a heating layer 7 and a carrier 8. The carrier 8 is a flexible layer made of a fibrous nonwoven with natural and/or synthetic fibers. The heating layer 7 is made of a flexible, electrically conducting plastic foam, like for example, electrically conductive polyurethane, from which a film or a foil is formed, so that a surface skin is produced. The film has no discernible pores, and can also be close-celled or closed-porous in its microstructure. In particular, the material is UV-resistant and/or hydrolysable or steam-permeable, in order to be used in upholstery for furniture for sitting or lying, in accordance with the most preferred use. In this way, an optimal acclimatization through the substrate is ensured for the user.

The material for the formation of the film, such as UV-resistant, and hydrolysable, or steam-permeable, cross linked single component polyurethane, is applied, for example, by spraying onto the fibrous nonwoven, so that a so-called spray-flush or a spray-skin is formed by this so-called spray-flush method. Alternately, the film could also be formed on the seat cover 5 or the elastic foam-molded article 6 by this method. The material could also be sprayed into the foam mold for the elastic foam-molded article 6 before the introduction of the foam material, so as to bind it with the latter during its curing. In a production of the film by spraying, the thickness of the film can be set very precisely, for example, by the spraying time, and optionally, it can be varied over its course. Alternately, the film can also be produced by rolling or brushing the corresponding material, in particular, on the carrier 7, but it can also be produced separately and then, optionally, be joined with the carrier, 7, the seat cover 5, or the elastic foam-molded article 6.

Contact ends 9 and 10 of current supply wires 11 and 12 are affixed between the heating layer 7 and the carrier 8, on the edge of the heating layer 7, in such a way that they are in electrically conducting contact with the heating layer 7 (see also FIG. 1b).

For the production of the surface heating 1 of the first embodiment example, flowable or liquid electrically conducting polyurethane material, which contains, for example, carbon particles, as already explained further above, is also applied by rolling, brushing, or spraying onto the fibrous nonwoven of the carrier 8, after the contact ends 9 and 10 of the current supply wires 11 and 12 were suitably affixed on the fibrous nonwoven of the carrier 8. After the curing of the electrically conducting polyurethane foam, it is, flexibly, in electrically conducting contact with the contact ends 9 and 10 of the current supply wires 11 and 12 and forms the heating layer 7. The contact ends 9 and 10 of the current supply wires 11 and 12 can be held alone by the composite forces between the polyurethane foam and the fibrous nonwoven. For a further securing of the fixing, the contact ends 9 and 10 of the current supply wires 11 and 12 can also be sewn with the composite (not shown). With this variant, the electrically conductive PU ply of the heating layer also simultaneously represents an adhesive or cementing layer.

Instead of forming the heating layer 7 directly on the fibrous nonwoven of the carrier 8, the heating layer 7 can also be formed separately and can be conducted together with the carrier in the cured, but flexible state. The fixing between the heating layer 7 and the carrier 8 is done, for example, by cementing, sewing, or welding, depending on which processing can be carried out as a function of the used materials. The contact ends 9 and 10 of the current supply wires 11 and 12 need not inevitably lie between the carrier 8 and the heating layer 7, but rather, on the side of the heating layer turned away from the carrier 8, can be brought together also with the latter, so as to obtain an electrically conducting contact.

The fibrous nonwoven of the carrier 8 can also initially be a tape material, on which, the heating layer 7 is formed, shaped full surface or in accordance with the geometry required for the seat surface part 3, or the prefabricated heating layer 7 is affixed on it, also as a tape material or as parts shaped according to the geometry required for the seat surface part 3, and joined with it. Subsequently, the desired individual pieces can be produced in accordance with the geometry required for the seat surface part 3, for example, by punching out. However, it is also possible to produce the fibrous nonwoven first in the geometry required for the seat surface part 3 and then to form the heating layer 7, which can also be prefabricated already beforehand, in accordance with the geometry required for the seat surface part 3. The contact ends 9 and 10 of the current supply wires 11 and 12 can be correspondingly and suitably affixed in between during the production of the composite of the carrier 8 and heating layer 7, or can be affixed on the composite which is at least joined together for suitable affixing.

FIG. 1b further illustrates, in a schematic, perspective view, the first embodiment example of the surface heating 1, with the omission of the seat cover 5. One can also clearly see the course of the contact ends 9 and 10 of the current supply wires 11 and 12. Furthermore, a current control 13 and a current source 14 for the control and the operation of the surface heating 1 are schematically shown. The current control 13 can be actuated manually and/or electrically/electronically and/or can be automatic. In actual practice, the current control 13 is the usual control of the temperature of the interior of the vehicle or a part of it, or a separate control. The current supply wires 11 and 12 are connected to the current control 13 and end, as it were, in their contact ends 9 and 10. Before the contact ends 9 and 10, for example, a function unit 15 can be provided at the current supply wires 11 and 12, which can comprise, for example, a separate seat pressure sensor, a heat sensor, or temperature probe, a distributor and many other things.

The carrier 8 can be formed from other materials and structures, such as from a fabric, instead of a fibrous nonwoven. The carrier 8, however, could also be a molded part, such as the elastic foam-molded article 6 of the first embodiment example itself, in accordance with FIGS. 1a and 1b.

Suitable materials for the heating layer—that is, the electrically conductive foam material—are specified in the documents under consideration, in particular, with regard to their physical characteristics, and moreover, are well known to experts and, for example, are also indicated in the state of the art, which is cited in the documents under consideration, so that we do not have to go into this in more detail, but rather by reference, all suitable materials, in particular, from the indicated, older publications and those cited in the documents under consideration, are received herein.

Although it was not explained in the preceding nor is it shown in FIG. 1b, the backrest 16, which is only partially visible in FIG. 1b, can also be equipped with a surface heating 1. Furthermore, without restriction, all similar objects, such as, in particular, mattresses or other upholstery, can be equipped with a surface heating 1, in accordance with the invention. In addition, a use of the invention in side linings and floor coverings, in particular, in motor vehicles, is preferred.

Figure 2A:
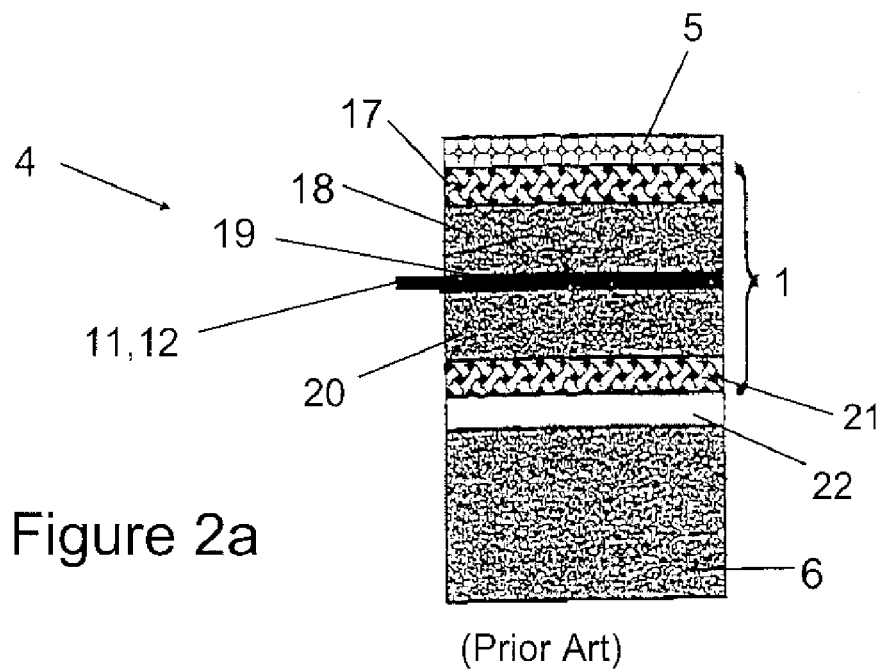
FIGS. 2a and b, schematically in a cut or perspective, partial view, a motor vehicle seat with a seat heating according to the state of the art.
Figure 2B:
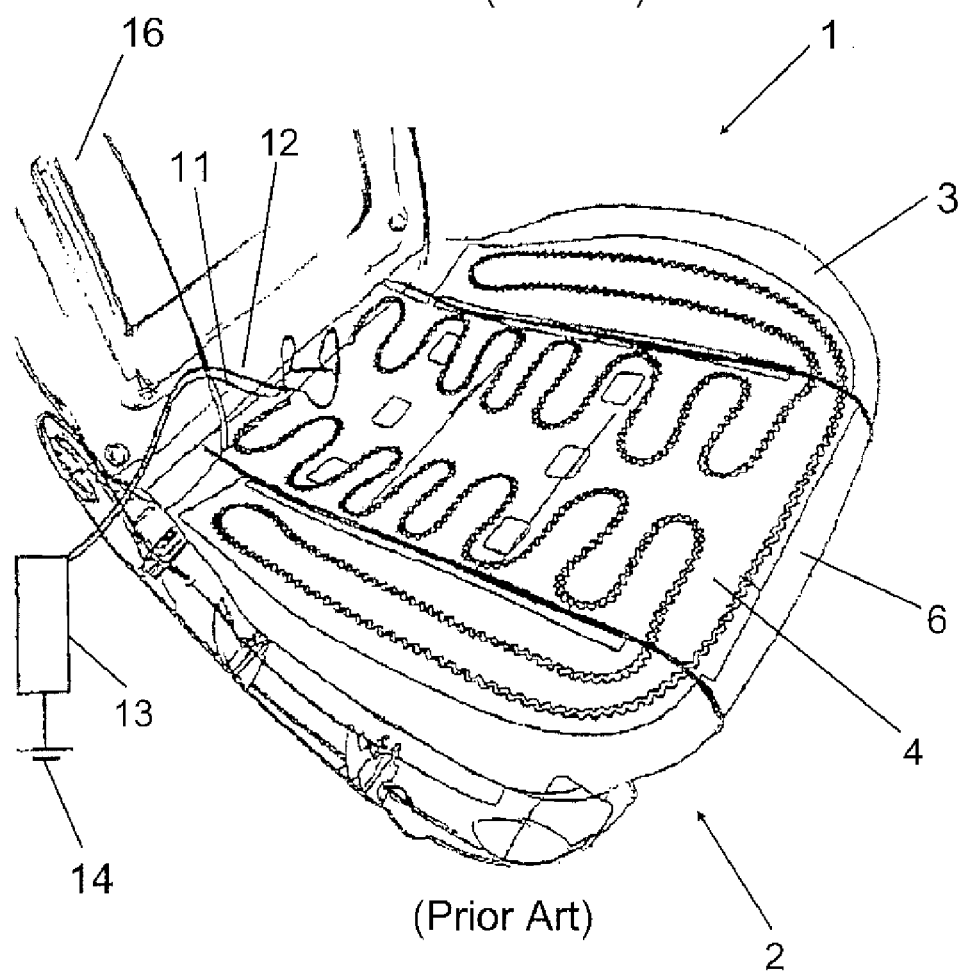

FIGS. 2a and 2b show depictions analogous to FIGS. 1a and 1b, merely for an illustration of the differences of the invention under consideration with respect to the state of the art. This previously known surface heating 1, in the form of a seat heating 4 for a motor vehicle seat 2, shows, in the usual manner, the seat cover 5 and an elastic foam-molded article 6, between which lies the surface heating 1.

In the state of the art, the surface heating 1 contains, as illustrated by FIG. 2a, regarded from the seat cover 5 and one after the other: an upper fabric layer 17, an upper foam layer 18, a heating wire layer 19, a lower foam layer 20, and a lower fabric layer 21, which are bound, at least slip-resistant, by means of a two-sided adhesive tape 22, with the foam-molded article 6, which forms the actual seat cushion, as a prefabricated composite.

In the production of this surface heating according to the state of the art, the fabric layers 17 and 21 are first bound in a flame laminating method with the directly adjacent foam layers 18 and 20.

FIGS. 3a, 3b, and 3c, 4a and 4b, and 5a and 5b show other embodiment examples of heating devices in motor vehicles.

Figure 3A:
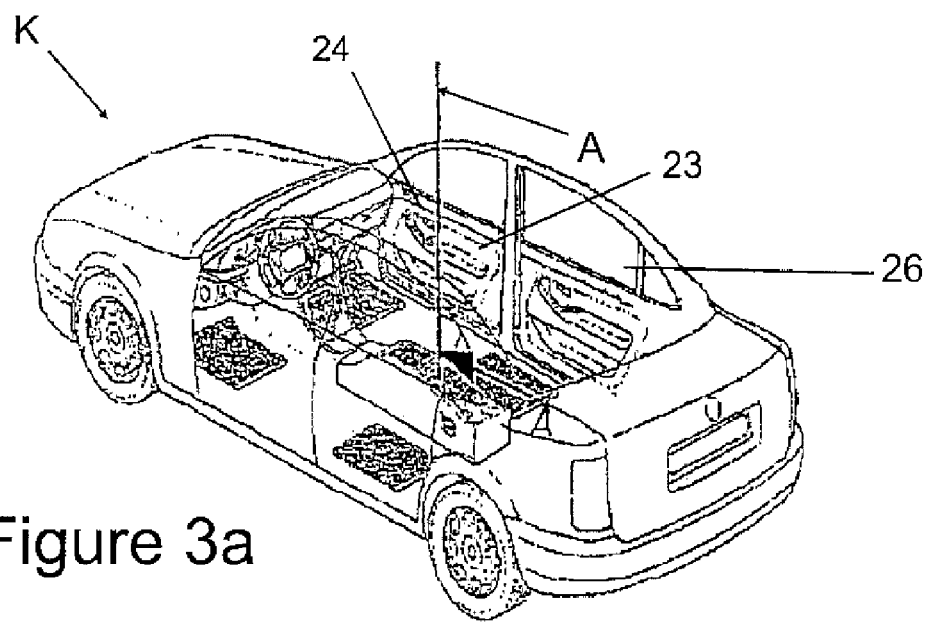
FIGS. 3a, 3b, and 3c, a second and a third embodiment example, a surface heating, in accordance with the invention, schematically in a perspective overview depiction or a side view each, in combination with an interior lining of a motor vehicle.
Figure 3B:
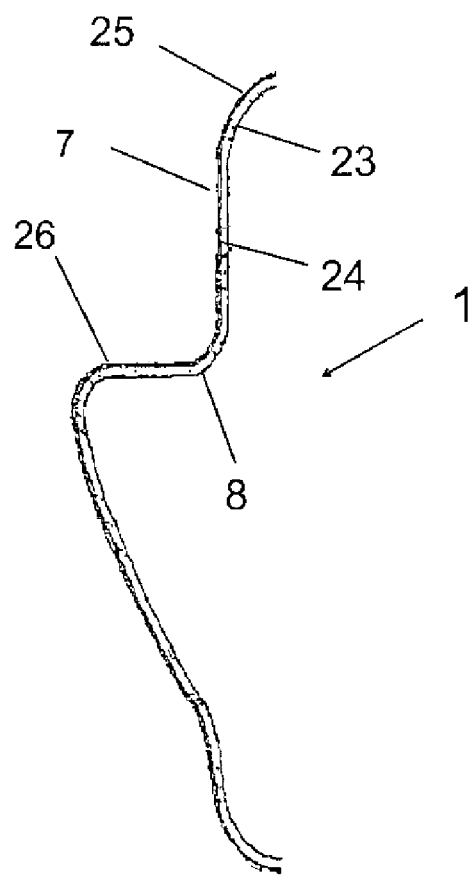

FIG. 3a shows a motor vehicle K in a cutout drawing, in which, schematically, a sectional plane A through an interior lining 23 of a vehicle door 24 is shown. The schematic sectional view of the interior lining 23 in the sectional plane A is shown, according to the arrows shown in FIG. 3a, as a second embodiment example of a heatable object with a surface heating 2 in FIG. 3b. This interior lining 23 contains, as a carrier 8, a carrier layer 24, on which the heating layer 7 with electrically conductive plastic is applied by means of an adhesive agent 25. Since the visible surface of the interior lining 23 is formed by the heating layer 7 with electrically conductive plastic, the free visible side 26 of the heating layer 7 with electrically conductive plastic can be provided with a decoration (not visible), for example, a synthetic leather-like appearance, so as to attain an attractive exterior of the interior lining 23.

Figure 3C:
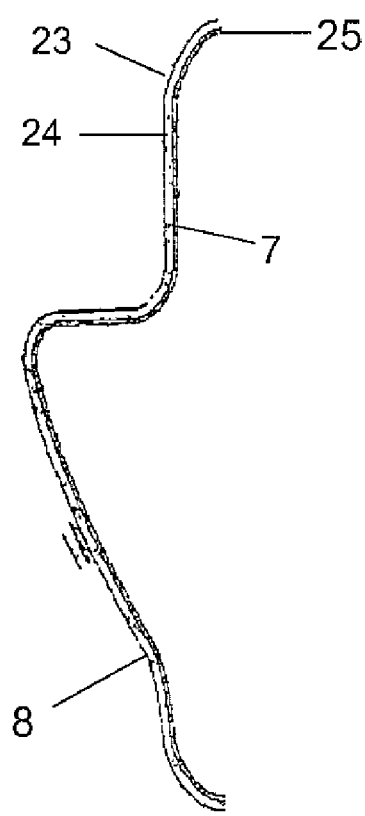

As an alternative to the embodiment example described in the preceding, the heating layer 7 with electrically conductive plastic can be applied by means of the adhesive agent 25 on the side of the carrier layer 24, turned away from the interior 26 of the motor vehicle K, in a variant of the preceding embodiment example, which is shown in FIG. 3c in a sectional view. In such a case, either the carrier layer 24 itself can be provided with a decoration (not visible) on its visible side, or a decoration 27 (only partially alluded to for better clarity), can be applied on the visible side of the carrier layer 24.

The principle of the two embodiment examples just described can be transferred to the entire passenger space 26 of the motor vehicle K, in particular, to the extent that the corresponding sides are upholstered. For example, passenger seats to implement or support a seat heating, a molded inside roof lining, a hat rack, column covers, consoles, a steering wheel, carpet material, air ducts, in particular, inside, primarily for the preheating of cold air, and many more things, can be used as heatable objects with heating devices, which contain a heating layer 7 with electrically conducting plastic, in order to improve the air conditioning in the interior of a motor vehicle. In this way, it is not only possible to design conventional heating units small, but rather it is also possible to attain a more rapidly and more uniformly distributed or directed heating of the entire interior 26 of a motor vehicle K. Other concrete embodiment examples for this are explained in FIGS. 4a and 4b as well as 5a and 5b.

Figure 4A:
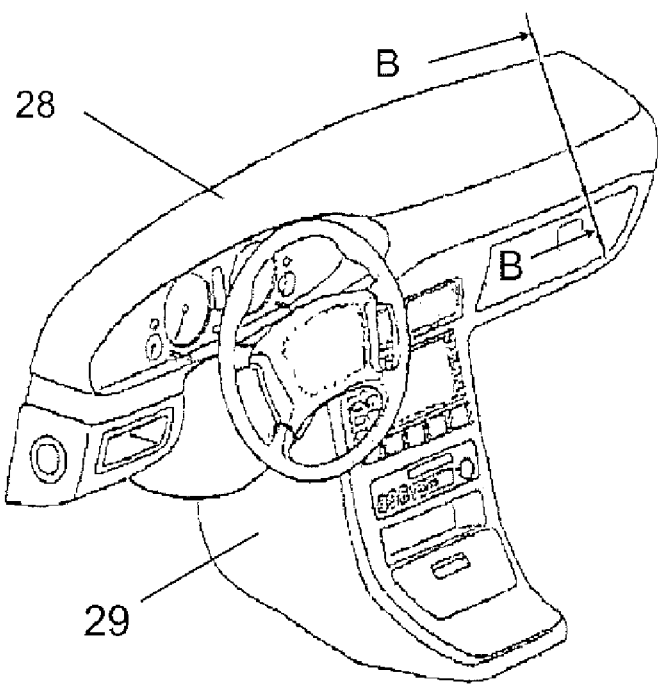
FIGS. 4a and 4b, schematically, an interior lining cover of a motor vehicle as a fourth embodiment example of a surface heating in a perspective overview depiction or a sectional view.
Figure 4B:
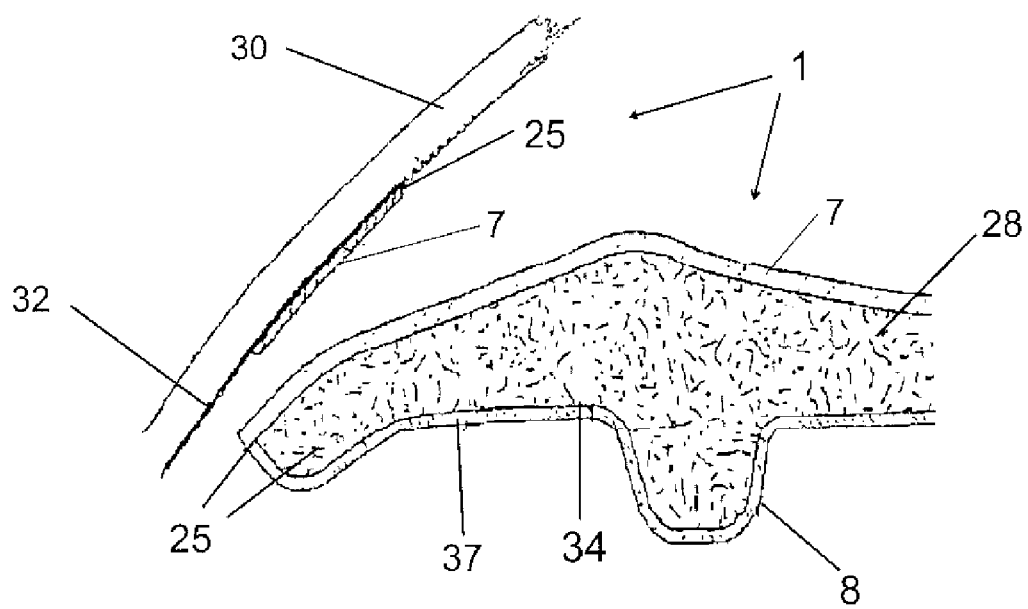

In a perspective view of an instrument panel 28 and a console 29, FIG. 4a shows the location of a sectional plane B, wherein the viewing direction of the sectional plane, in accordance with the depiction in FIG. 4b, is illustrated by arrows. FIG. 4b is the sectional view through the instrument panel 28 in the sectional plane B, wherein a part of an adjacent windshield 30 of the correspondingly equipped motor vehicle K is also shown in a sectional view. The heating layer 7 with electrically conductive plastic forms the plastic skin, with which the instrument panel 28 is covered and which forms the surface of the latter. By means of an adhesive agent 25, which in the fourth embodiment example under discussion is formed by a filler composition, such as foam, etc., the heating layer 7 with electrically conductive plastic is joined with a carrier layer 24, which serves as a holder 31, as a carrier 8. The heating layer 7 with electrically conductive plastic thereby forms a molded skin with embedded conductive material. As an alternative, the heating layer 7 with electrically conductive plastic could also be covered with a decorative layer (not shown) in this embodiment example, for example, analogous to the variant which is shown in FIG. 3c.

FIG. 4b partially shows, as another embodiment example of an object with a surface heating 1, a windshield 30 in sectional view. This windshield 30 is provided with a black ceramic layer 32 in the area of its circumference, which, for example, can be applied by means of screen printing. Furthermore, provision is made so that in the area of the ceramic layer 32, a heating layer 7 with electrically conductive plastic is affixed on the windshield 30, directly or by means of an adhesive agent 25, like, for example, glue. By means of this conformation, for example, a circulating additional and/or separate heating of the windshield 30 can be implemented to prevent or eliminate a fogging up or to remove ice. Furthermore, such a surface heating 1 can be provided, in particular, in the area of position at rest of the windshield wipers (not depicted), so as to implement an additional and/or separate heating of the windshield 30, so that damage to solidly frozen windshield wipers (not depicted) can be avoided when the windshield wiper (not depicted) is actuated.

If the heating layer 7 with electrically conductive plastic is made of transparent material, then a transparent area of a pane, as, for example, a windshield 30, can also be provided with a corresponding surface heating 1. In this way, a fogging up of a pane equipped in this way can also be eliminated or avoided and icing can also be melted. The heating conductor previously used, for example, with rear windows (not depicted) could then be omitted or have smaller dimensions.

Figure 5A:
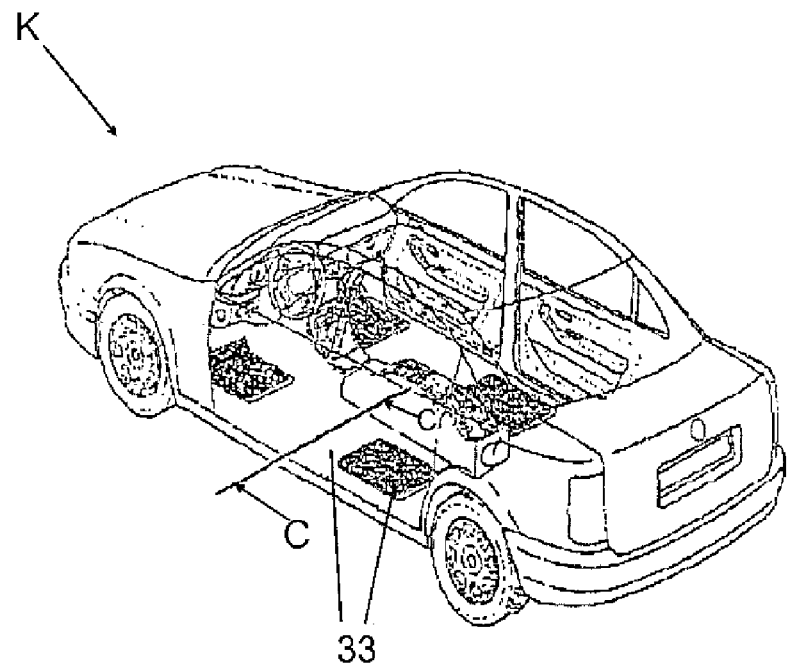
FIGS. 5a and 5b, schematically a fifth embodiment example of an object with a surface heating, in a perspective overview depiction or a sectional view in the form of a floor cover of a motor vehicle.
Figure 5B:
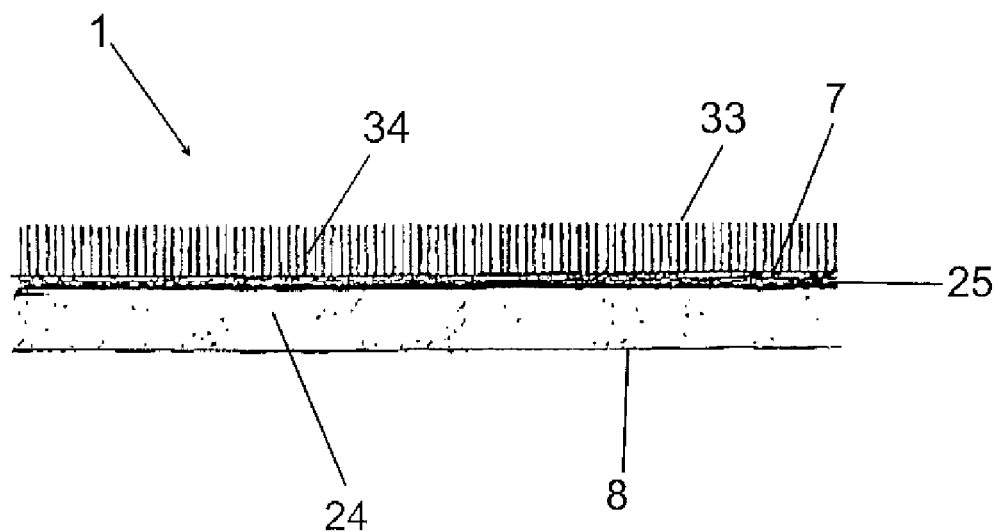

As another variant for the heating of the interior of a motor vehicle K, the formation of carpet material 33 with a surface heating 1 is clarified in FIGS. 5a and 5b. In this sixth embodiment example, which is clarified in FIG. 5b in a partial sectional view, which can be seen in accordance with the arrow pointing to a sectional plane C in the depiction of FIG. 5a, the structure of such a carpet material 33 is shown. The heating layer 7 with electrically conductive plastic is thereby bound with a lower carrier layer 24, as the carrier 8, by means of the adhesive agent 25.

The bristles, loops, or generally, fibers/threads 34, which form the upper side of the carpet material 33, can thereby be affixed either on the carrier layer 24 and go through the heating layer 7 with electrically conductive plastic, can be affixed directly only on the layer with electrically conductive plastic, or can proceed from a separate layer (not depicted), which is bound with the heating layer 7 with electrically conductive plastic by means of an adhesive agent 25. In the latter case, the carrier layer 24 can also be omitted and the carrier 8 can be formed by such a separate layer (not depicted).

It is within the framework of the invention under consideration if the heating layer 7 with electrically conductive plastic is formed directly by the carrier layer 24, or if the heating layer 7 with electrically conductive plastic is affixed on the carrier layer 24, by means of the bristles, loops, fibers or threads 34, which form the upper side of the carpet material 33. Furthermore, it is possible to affix the heating layer 7 with electrically conductive plastic, using an adhesive agent 25, on the underside of the carrier layer 24, so that traditional carpet material 33 can also be produced in the usual manner and can subsequently be provided with surface heating. It is also possible to equip already existing carpet material 33, accordingly, with a surface heating 1.

As already mentioned, it is possible to attain a desired heating or warming effect with the corresponding heated objects by connecting the heating layer 7 with the electrically conductive plastic material to a current source (not depicted). Since the electrical resistance of the heating layer 7 is constant, the heating temperature can be determined or regulated via the supplied electrical output. In an advantageous manner, there is the possibility of using both direct current and alternating current, in particular, without electrosmog being formed. Since the heat produced in this way is also exclusively radiation heat, a certain temperature and heating comfort is generated.

When using natural raw materials, such as wood fibers, sisal, material from banana trees, coconut fibers, etc., the formation of odors in humid weather and bacterial infestation are often great problems. If, as in the previously described embodiment examples, interior lining parts are constructed so they can be heated, then in a combination effect for a pure heating effect, it is also possible to avoid such an odor formation and a bacterial infestation.

Other concrete examples for heatable objects with a surface heating 1 are, according to the invention under consideration, for example, a diesel tank made of plastic, wherein a gelling of diesel fuel with low outside temperatures can be prevented in that a minimum temperature can be maintained; an oil sump which, when heated, can preheat the motor oil for a better and more efficient operation of the motor; an entire motor space, which makes possible a preheating of the motor; and, for example, loading space both in private cars and freight vehicles. Thus, surface heatings 1 can be advantageously used in the interior space and in the outside area of vehicles.

However, the invention under consideration is not limited to use in the area of motor vehicles. All previously mentioned embodiment examples and variants and analogous uses can also be used, for example, in other vehicles with two wheels, in the railroad field, with ships and airplanes.

As already mentioned, numerous other areas of application for the invention under consideration are possible; thus, for example, with motorcycles and mopeds, among others, seats and operating elements can be equipped with corresponding surface heatings. Other usage possibilities exist, for example, in the household (covering of plastic wallpaper, wooden ceilings, wooden floors, carpets, tiles, coverings for heating pipes and water pipes, floor heatings), with clothing and the like (shoes, boots, ski boots, work uniforms, protective clothing, gloves, electric heating blankets, warming blankets, for example, in the clinical area, heating containers) in sports and leisure activities (artificial turf for sports fields, underside of tents, sleeping overlayers in the tent) and in the military field (among other things, preliminary heating in the vehicle so as to better start the engine in the winter).

In particular, aliphatic and aromatic polyurethanes are mentioned here merely as preferred electrically conductive plastic materials or materials which can be made electrically conductive.

With regard to the production of a surface heating or an object with it, in accordance with the invention, it is preferable if the layer with or of electrically conductive plastic is produced in the spray or immersion method or by roller application. A corresponding coating with it is preferably provided in a method for the production of a heating device or an object. The invention thus makes possible, in particular, an adaptation or selection of the coating method also, with regard to the geometry of the form to be coated and/or the number of units to be produced.

In the comparable embodiments, discussed by way of example in the preceding, the layer thickness of the electrically conducting layer is preferably between perhaps 0.05 mm and approximately 0.3 mm. If the electrically conducting layer is also to fulfill a function as a visible surface, it is preferable if the thickness is greater. In particular, it is also within the scope of the invention under consideration to adapt the layer thickness, as a function of the requirement or the requirement profile, to the surface heating or the object, which can be readily determined by due reflection or tests. For example, a layer thickness of 1.2 mm is provided if it is a surface layer with an additional function, such as an interior lining of a vehicle.

As already indicated, particularly preferred specifications for the plastic material of the heating layer 7 are that it contain polyurethane or be made of it—preferably cross linked and/or single component polyurethane, which is, in particular, UV-resistant and hydrolysable or steam-permeable.

As a specific specialty of the invention under consideration, one should regard a variant in which, simultaneous to the seat heating with the location of the surface heating 1, a particularly weight-dependent seat occupancy recognition is implemented. Such seat occupancy recognition must nowadays be implemented separately, so as to, for example, carry out the release of an airbag in the case of an accident, if an occupant sits on a corresponding seat. By the combined implementation of the surface heating 1, according to the invention under consideration, with the simultaneous function of a seat occupancy recognition, which can also provide weight-dependent information, so as to eventually control the type and vigorousness of an airbag triggering accordingly, not only is the construction expense saved, but also volume and weight in or on the vehicle—at those points where it is not required for the stability and safety of the vehicle.

Figure 6:
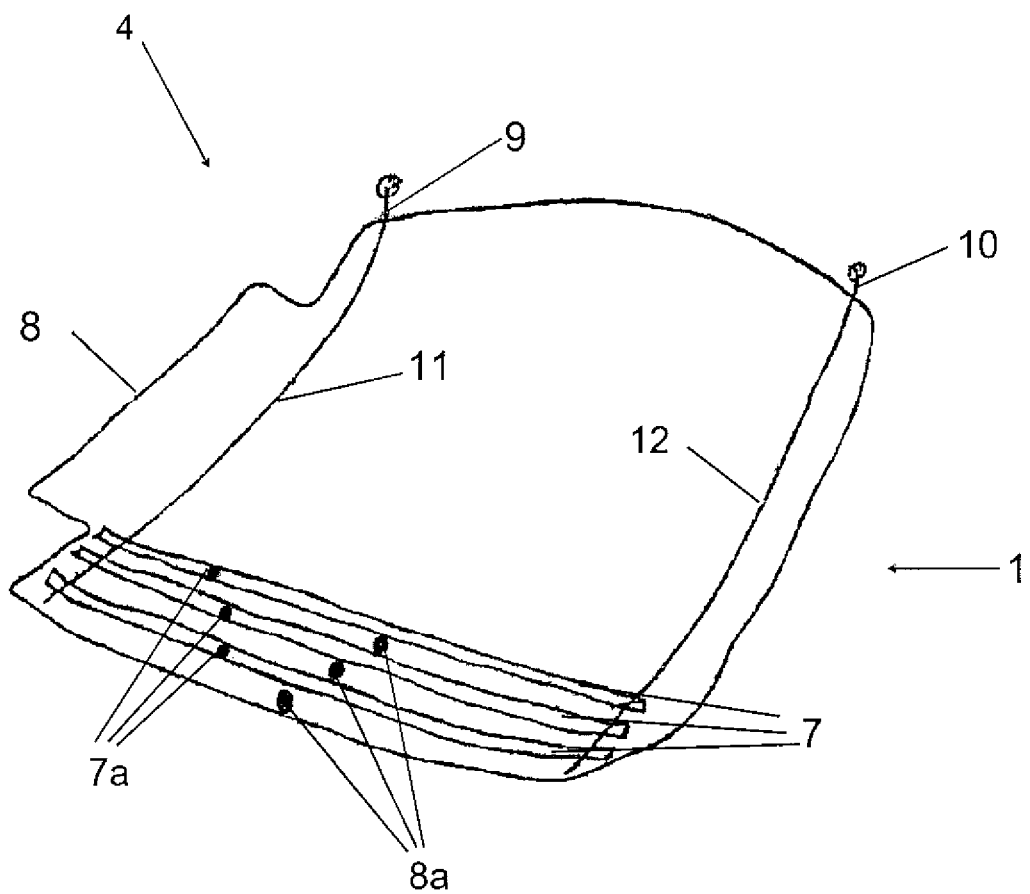
FIG. 6, schematically, as a sixth embodiment example of the invention, in a perspective, partial view, a motor vehicle seat with a seat heating.

The surface heating 1 contains, in particular, a striped heating layer 7 with electrically conductive plastic, as is illustrated schematically, for example, in FIG. 6. Moreover, all features according to the formation according to FIGS. 1a and 1b can be combined with the embodiment example under consideration and are understandable for any specialist, so that corresponding descriptions will be omitted here.

Although not depicted separately in the drawing, nevertheless an essential use of the invention under consideration, is a mattress with a surface heating, in accordance with the invention. In comparison to the state of the art in which a so-called heating cover has metal resistance heating wires, such a formed mattress has the advantage that the operating safety is at least substantially improved. With a surface heating according to the invention under consideration, a fire cannot occur. In case of damage to the heating layer, which can also be constructed in the form of stripes, there are no sparks, as with metal conductors.

Likewise, further above, in particular in connection with the first embodiment example, it was already explained that the heating layer 7 is a film or a foil. Preferably, it is a lacquer-type polyurethane layer or a polyurethane-lacquer layer with the indicated physical characteristics, in particular, an enrichment with carbon dust to attain electrical conductivity. Furthermore, it is preferred for it to be a single component polyurethane material and/or for an enrichment with carbon dust to be provided for the electrical conductivity.

A preferred thickness of the heating layer 7 is ca. 0.3 mm to approximately 0.5 mm.

Instead of the spray application of the electrically conducting plastic material on the carrier, which was already described in detail further above, a roller method can also be used, for example. Liquid, for example, polyurethane is applied on a roller and released to an underlying stratum, such as the carrier or an external substrate. The distance between the circumferential surface of the roller and the underlying stratum determines the thickness of the heating layer. After the consolidation or curing of the polyurethane, a lacquer film is, in turn, obtained with the desired characteristics, wherein shaping measures can be carried out on the film, including cutting, during the roller application or afterwards, as was already discussed further above.

If the heating layer is, perhaps, produced on the carrier by a suitable method, then subsequently, perhaps the heating layer alone or already together with the carrier can be bound with a carrier or, for example, a molded article or a cover by sewing, cementing, a Velcro tape, etc.; this was also already discussed further above.

The surface heating can be operated with direct or alternating current, wherein the response behavior is better when operated with direct current.

In comparison with earlier systems with metal heating wires, other advantages of the surface heating, in accordance with the invention—in addition to the cost advantage—lie in the uniform heating behavior and in the lower current consumption in comparison with, for example, previous traditional seat heatings with metal heating wires, as a corresponding experimental series shows.

A standard seat heating from the Bauerhin (Model S4300) was compared with a surface heating, in accordance with the invention, see Table 1, with a heating mat made of electrically conductive plastic. The seat surface and the backrest of the seat were separately controllable. The heating mat was hooked on the seat, above, via head support shells and affixed on the edge by adhesive tape.

The measurements are intended to give information on the heating behavior and current consumption of the two seat heatings. The goal of the experiment was concrete: to determine the heating times with the proper current consumption for both models. To this end, a constant voltage of 12 V was applied to the connecting terminal at both heatings. The consumed current is measured via a current gauge integrated in the voltage supply. At intervals of 1 min, the temperature and the current are measured. A comparison between the two heatings is carried out via recorded values on the seat.

TABLE 1

| Heating mat Made of conducting Plastic | | | Heating S4300 Bauerhin Company | |
| --- | --- | --- | --- | --- |
| Temperature in ° C. | Current in A | Time in min. | Temperature in ° C. | Current in A |
| 21.4 | 7.4 | 0 | 22.4 | 0.0 |
| 26.0 | 7.1 | 1 | 24.1 | 7.8 |
| 30.4 | 6.8 | 2 | 26.9 | 7.7 |
| 36.0 | 6.7 | 3 | 28.8 | 7.7 |
| 37.0 | 6.6 | 4 | 30.3 | 7.6 |
| 7.0 | 6.6 | 5 | 31.1 | 7.6 |
| 39.1 | 6.5 | 6 | 31.3 | 7.6 |
| 40.3 | 6.5 | 7 | 32.5 | 7.6 |
| 41.4 | 6.5 | 8 | 33.0 | 7.6 |
| 42.1 | 6.5 | 9 | 34.0 | 7.6 |
| 42.6 | 6.5 | 10 | 34.4 | 7.9 |
| 43.1 | 6.5 | 11 | 34.7 | 7.6 |
| 43.7 | 6.5 | 12 | 35.0 | 7.7 |
| 44.4 | 6.5 | 13 | 35.4 | 8.0 |
| 44.7 | 6.5 | 14 | 35.8 | 8.0 |
| 45.1 | 6.5 | 15 | 35.6 | 7.6 |
| 46.0 | 6.4 | 25 | 36.0 | 7.6 |
| 48.1 | 6.6 | 50 | 36.1 | 7.7 |

In the heating mat of the surface heating, in accordance with the invention with a heating layer with electrically conductive plastic, the temperature measuring point was approximately in the center of the seating surface. With the item according to the traditional mode of construction with metal heating wires, the temperature measuring point was approximately 0.5 cm from a heating wire. The temperature, measured on the heating wire itself, was 50° C. after 25 min. This temperature is necessary so as to attain a surface effect. In actual practice, however, considerable problems are connected with this, in that, for example, the wire can burn out or the seat cover can catch on fire because of excessively high temperatures. These problems are eliminated with the surface heating, in accordance with the invention.

In the traditional seat heating, another not inconsiderable disadvantage is the temperature in the position of the male genital area, which, under certain circumstances and at specific points, is high, which can lead to a disturbance of fertility. The surface heating, in accordance with the invention, does not basically produce excessively high temperatures, since it can, in fact, release the heat over the whole surface, and moreover, can be omitted at the corresponding site or made weaker.

Other tests have shown that the heating behaviors of the seat and back part are approximately the same.

The superiority of the new surface heating, according to the invention and in comparison with the previous model with metal conductor wires, is very clearly shown from the test results. The surface heating with the heating layer with electrically conducting plastic heats more rapidly and consumes less current than the traditional seat heating.

A surface heating is thus created by the invention, which can release heat over the entire surface, which also with a design with a heating layer consisting of individual strips, which, under certain circumstances, are at a distance from one another, can be ensured better than in the state of the art; which adapts itself reversibly to a pressure load of a substrate, such as, for example, a seat-foam body; and which does not lead to an accumulation of moisture or air when used.

The invention under consideration is not basically limited to the heating of upholstery objects, but the uses of the surface heating, in accordance with the invention, as a seat or mattress heating for or in one seat, in particular a vehicle seat, [or] one mattress, are particularly preferred and advantageous so that a separate patent protection directed at them is justified. The flexibility of the heating layer is particularly important therein.

According to an additional aspect of the invention under consideration, this concerns a seat occupancy recognition, a seat with it, and a seat occupancy recognition method, corresponding to the preambles of claims 28, 32, and 33. This aspect in its individual developments is herein disclosed both in itself, and also in combination with the first aspect of the invention—that is, the surface heating, the method for its production, and the heatable object.

The core of the seat occupancy recognition is created by elements made of electrically conductive plastic in a seat. Preferably, elements made of electrically conductive plastic are affixed, for this purpose, in a seat cushion and, in particular, also the backrest, and preferably also in the head support. Preferably, they are strips, preferably made of electrically conductive PU, arranged, in particular, at right angles to the direction of travel, at pre-specified intervals.

It is particularly preferred if the material of these strips or, in general, elements, contain 50–70%, especially 55–60%, preferably approximately 58% graphite and 30–50%, especially 40–45%, preferably approximately 42% PU. Furthermore, it is particularly preferred if these strips or, in general, elements, are flexible and in particular, stretchable, and preferably, stretchable in a permanently reversible manner.

These elements, or in particular, strips, are part of a current circuit. By stretching the elements, or in particular strips, their cross-section changes in such a way that it is reduced. A cross-section change leads to a resistance change in the form that with a cross-section reduction of the electrically conducting elements, or in particular, strips, their electrical resistance [is reduced], if an electrical current is conducted through them. The change of the electrical resistance can be detected and the corresponding information be used for seat occupancy recognition. In addition, detection devices and processing devices corresponding to the apparatus are provided; they are connected via suitable signal wires.

In accordance with a further refinement, a previously explained cross-section reduction of the elements, and in particular, strips, made of electrically conductive plastic, such as polyurethane, takes place as a function of the load, that is, the weight of a person sitting on a correspondingly equipped seat. By the latter arrangement, not only the basic state of a seat occupancy, but also the weight of a person can be determined, at least in the order of magnitude.

The load-causing cross-section reduction of the elements, or in particular, strips, leads to a change of their electrical resistance, which is particularly dependent on the load. Via this change, it is basically possible, on the one hand, to recognize a seat occupancy and particularly, to determine the weight of a person in accordance with the explained further refinement. The corresponding resistance change is determined by a sensor or detector, whose output signal is passed on to processing and/or control devices, which, as a function of the output signal of the sensor, determine a seat occupancy and under certain circumstances, the weight of a person, and in turn, as a function thereof, those devices control other devices, for example, in a motor vehicle, such as airbag devices, seat belt-tightening devices, seat and/or steering wheel adjustments, etc. It is precisely in the control of safety devices, such as airbags, seat belt-tightening devices, and the like, that the information of a seat occupancy recognition is particularly advantageous. Furthermore, it is of special advantage if the information of the seat recognition is combined, for example, with seat position information, since by the corresponding combination, an optimal control of the safety devices can take place as a function of the size and weight of an occupant. Accordingly, the opening behavior of an airbag, for example, can be adapted to the needs of the occupant or passenger.

Figure 7:
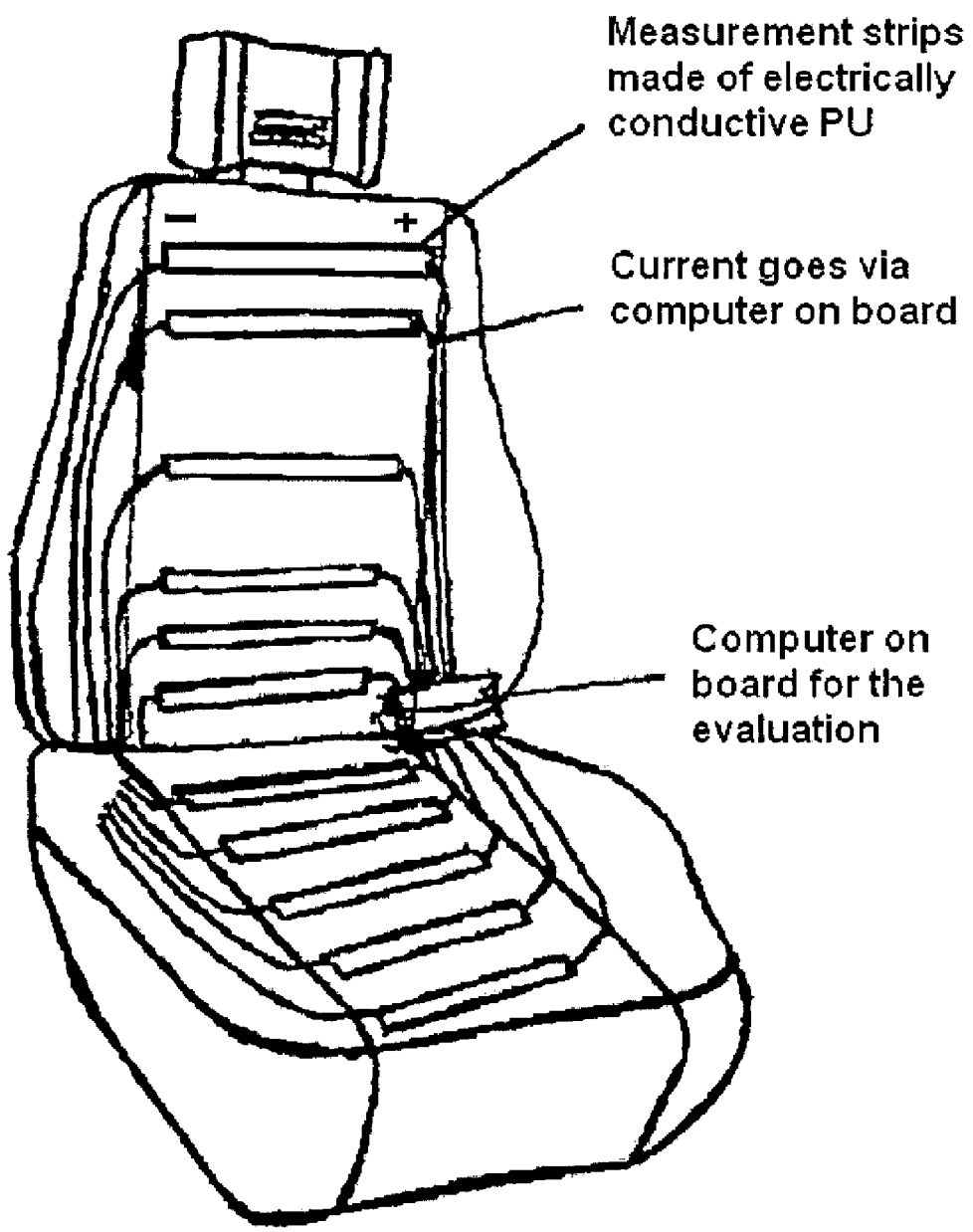
FIG. 7, schematically, a seventh embodiment example, in a perspective view, of a seat occupancy recognition with the aid of a motor vehicle seat equipped with the seat occupancy recognition.

An embodiment example of a seat occupancy recognition is schematically shown in FIG. 7 with the aid of a motor vehicle seat equipped with it.

By the aspect of the invention under consideration described in the preceding, a seat occupancy recognition, a seat with it, and a seat occupancy recognition method are created in a particularly simple and reliable manner. In particular, the stretching capacity and flexibility of the material are of advantage therein so that the corresponding elements, or in particular, strips, made of electrically conductive plastic, preferably, polyurethane (PU) can be basically adapted not only to a particular occupant, but rather when using a seat equipped in such a manner, can also undergo any change dynamically. In particular, this means that not only a seat occupancy recognition is implemented technically with it, but rather placement force measurement devices are created, by means of which, a pressure load at/on a seat, for example, of a vehicle, by an occupant and traveling conditions can be determined at any time. Thus, information regarding the actual seat position and posture of an occupant, such as "bent forwards," and traveling load situations, such as braking or accelerating with the consequence of different pressure loads, for example, on the backrest of the seat, can be determined at any time and registered in particular by a central processing and control unit (computer on board) and are taken into consideration in the control of other components, such as safety devices.

For the execution, design, and material composition of the seat occupancy recognition, the corresponding features of the surface heating described further above are valid, in their entire scope and without limitation. In this respect, reference is made to all data here, in their entire scope, in order to avoid a mere repeated rendition, in connection with the seat occupancy recognition.

The seat occupancy recognition, on the one hand, and the surface heating, on the other hand, and both in combination, which can be produced and implemented in a particularly advantageous manner by the same elements and thus at extremely low cost, can be produced, in particular, from material compositions disclosed in the documents under consideration. One preferred method is that a solvent is added to such a material composition so that the recipe obtained can be processed by spraying, rolling, brushing, or some other way, and in particular, can be applied to a carrier layer or surface. In a reaction process after the application, in particular, by an increase in temperature, solvent evaporation can be attained at the latest. Corresponding temperatures can be applied by infrared radiation, in a heating furnace, or in another suitable manner.

The invention under consideration thus refers to, on the one hand, a surface heating, a method for its production, and a heatable object, and on the other hand, a seat occupancy recognition, a seat with it, and a seat occupancy recognition method, individually and preferably in combination. It is precisely a combination which is of special advantage since the same physical devices can be used for the implementation of the two basic aspects of the invention under consideration.

The invention under consideration was explained in more detail, in the preceding, with the aid of embodiment examples, to which the invention, however, is not limited. All modifications, combinations, variations, and substitutions of the aspects and features given in the drawings and explained in the preceding, are comprised in the realm of technical knowledge by the invention under consideration. In particular, all development possibilities which lie within the scope of the corresponding claims belong to the invention. In particular, the uses indicated for the heating devices and seat occupancy recognition, in accordance with the invention, are also disclosed and are optionally to be regarded separately as worthy of patents.

What is claimed is:

1. A seat occupancy recognition system comprising:
    a support;
    a flexible sensing layer positioned on the support and including a flexible, electrically conductive plastic deformable from a first cross sectional area to a second cross sectional area, where the electrically conductive plastic has a first resistance in the first cross sectional area and a second resistance in the second cross sectional area different from the first resistance;
    a plurality of power supply wires each including a contact terminal in electrical connection with the sensing layer; and
    a power control unit operably connected to the plurality of power supply wires and including a sensor in electrical connection with the sensing layer, the sensor detecting a change in the resistance of the sensing layer as a result of a weight applied to the sensing layer.

2. Seat occupancy recognition system according to claim 1, further comprising a plurality of elements each in the shape of a strip made of the electrically conductive plastic and parallelly arranged in a spaced apart relationship.

3. Seat occupancy recognition system according to claim 1, wherein the electrically conductive plastic contains 50–70% graphite, and 30–50% PU.

4. Seat occupancy recognition system according to claim 1, further comprising devices for the recognition of a change from the first resistance to the second resistance in the element.

5. A seat occupancy recognition system as set forth in claim 1 wherein the support is an air permeable support including a flexible layer of fibers.

6. A seat occupancy recognition system as set forth in claim 5 wherein the support is a layer formed of a woven or nonwoven fabric.

7. A seat occupancy recognition system as set forth in claim 5 wherein the support is made of a nonwoven fiber material.

8. A seat occupancy recognition system as set forth in claim 1 wherein the flexible, electrically conductive plastic is polyurethane, single component polyurethane, crosslinked single component polyurethane, PU foam, UV-resistant material, hydrolysable-permeable plastic material, or steam-permeable plastic material.

9. A seat occupancy recognition system as set forth in claim 1 wherein the electrically conductive plastic includes graphite.

10. A seat occupancy recognition system as set forth in claim 1 wherein the sensing layer is formed directly on the support by spraying, rolling, or brushing thereon.

11. A seat occupancy recognition system as set forth in claim 1 wherein the sensing layer is cemented, sewn, or welded with the support.

12. A seat occupancy recognition system as set forth in claim 1 wherein the support is a molded article made of an elastic material.

13. A seat occupancy recognition system as set forth in claim 12 wherein the support is molded to form a portion of a mattress, a seat cushion, or a seat back.

14. A seat occupancy recognition system as set forth in claim 1 wherein the plurality of power supply wires each includes contact terminals in electrical connection with the sensing layer.

15. A seat occupancy recognition system as set forth in claim 14, wherein the contact terminals are positioned between the support and sensing layer.

16. A seat occupancy recognition system as set forth in claim 14 wherein the contact terminals are positioned in the sensing layer.

17. A seat occupancy recognition system as set forth in claim 14 wherein the contact terminals are affixed to a side portion of the sensing layer.

18. A seat occupancy recognition system as set forth in claim 14 wherein the contact terminals are affixed to the sensing layer by stitching or gluing.

19. A support device comprising a seat occupancy recognition system as, defined in claim 1.

20. A support device as set forth in claim 19 wherein the support is a car seat, a piece of furniture, or a mattress.

21. A support device as set forth in claim 20 wherein the sensing layer is anatomically matched to a contacting portion of a user.

22. A support device as set forth in claim 19 further comprising a cover covering the occupancy recognition system.

23. A support device as set forth in claim 22 wherein the cover is a material selected from the group consisting of a fabric, leather, synthetic material, and combinations thereof.

24. Seat occupancy recognition system according to claim 1 further comprising a support, wherein the flexible, electrically conductive plastic is positioned on the support.

25. Seat occupancy recognition system according to claim 24 wherein the support is a woven fabric or a nonwoven fabric.

26. Seat occupancy recognition system according to claim 25 where the fabric of the support is a natural or synthetic fibrous nonwoven fabric.

27. Seat occupancy recognition system according to claim 24 wherein the flexible, electrically conductive plastic is formed directly on the support by spraying, rolling, or brushing thereon.

28. Seat occupancy recognition system according to claim 24 wherein the flexible, electrically conductive plastic is cemented, sewn, or welded to the support.

29. Seat occupancy recognition system according to claim 24 wherein the support is a molded article made of an elastic material.

30. Seat occupancy recognition system according to claim 24 wherein the molded article is a seat upholstery of a seat surface part, a backrest, an upholstery of furniture for sitting or lying.

31. Seat occupancy recognition system according to claim 24 further comprising current supply wires having contact ends in electrical communication with the flexible, electrically conductive plastic, wherein the contact ends are positioned in the flexible, electrically conductive plastic or between the support and the flexible, electrically conductive plastic.

32. Seat occupancy recognition system according to claim 31 further comprising: a current source; and
   a current control connected with the current source; wherein the current supply wires are connected to the current control to supply a current to the flexible, electrically conductive plastic.

33. Seat occupancy recognition system according to claim 32 further comprising a sensor in electrical connection with the flexible, electrically conductive plastic.

34. Seat occupancy recognition system according to claim 33 wherein the sensor detects a change in the resistance of the flexible, electrically conductive plastic as a result of a weight applied to the flexible, electrically conductive plastic.

* * * * *